Nov. 15, 1966  D. D. SHAUL  3,285,025
MULTI-STAGE CRYSTALLIZATION PROCESS
Filed Dec. 20, 1963
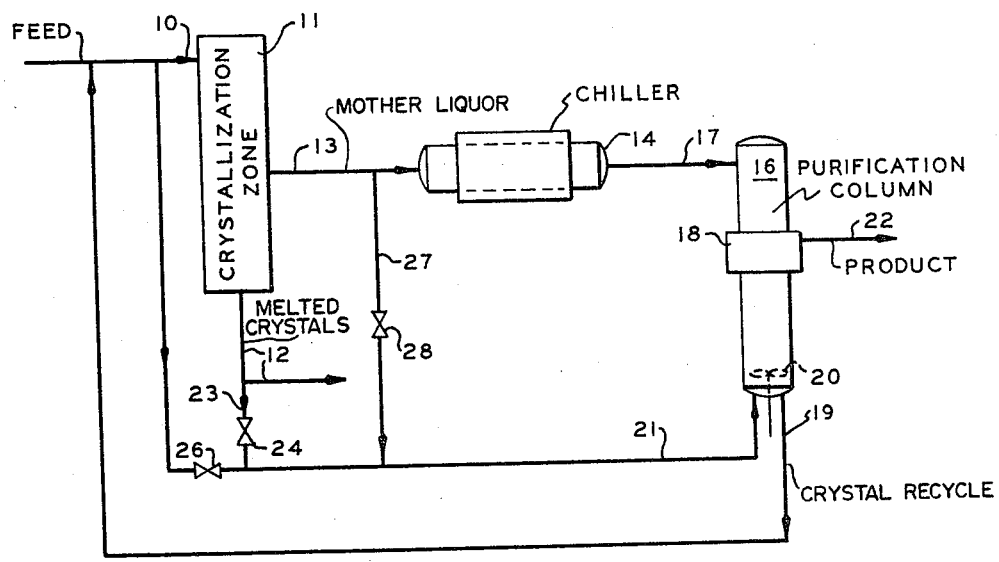
INVENTOR.
D.D. SHAUL
BY *Young & Quigg*
ATTORNEYS

United States Patent Office 3,285,025
Patented Nov. 15, 1966

3,285,025
MULTI-STAGE CRYSTALLIZATION PROCESS
Duane D. Shaul, Bartlesville, Okla., assignor to Phillips Petroleum Company, a corporation of Delaware
Filed Dec. 20, 1963, Ser. No. 332,081
8 Claims. (Cl. 62—58)

This invention relates to a multi-stage crystallization process and apparatus therefor.

The separation of chemical compounds by means of crystallization finds many applications in industrial installations. While separation by distillation or solvent extraction seems to be generally preferred, there are cases when these methods are impractical or impossible and the desired separation can be effected only by means of crystallization. Thus when confronted with chemical isomers having similar boiling points and solubilities, or with materials having relatively high boiling points, or with thermally unstable substances, or with solutions containing both volatile and non-volatile impurities or undesired constituents, separation by crystallization may be the only method which can be advantageously employed.

Conventionally, for example, aqueous solutions can be concentrated by crystallization involving chilling the aqueous solution to form ice crystals with subsequent separation of the ice crystals from the mother liquor. This method as applied to the concentration of food products has become commercially acceptable for reasons that it can be carried out without damaging the taste of the food product. In this respect, concentration by crystallization represents a considerable improvement over, for example, evaporative processes which rely upon both heat and/or extremely low pressures. The removal of water by evaporation also results in the removal of much of the essential oils and esters, many of which are not recoverable, so that the concentrated product can never be restored to its original freshness and flavor. Concentration by crystallization can be employed to advantage in the processing of such food products and beverages as milk, fruit juices, vegetable juices, vinegar, beer, wine, liquors and the like. As applied to beer, the process has the additional advantage of serving as an accelerated lagering process, thereby reducing the requirement for large refrigerated storage tanks in breweries.

The crystallization process can be conducted in multiple stages. For example, when applied to the concentration of aqueous solutions, the mother liquor recovered from a first crystallization stage is passed to a second crystallization stage as feed and the mother liquor recovered from the second crystallization stage passed to a third and succeeding crystallization stages in like manner until concentration of the aqueous solution is complete. A method of concentrating within each crystallization stage involves chilling the aqueous solution in a chiller to form a slurry of ice crystals and mother liquor and then forcing the resulting slurry into a crystal purification column such as described in the patent to Schmidt, Re. 23,810, and the patent to R. W. Thomas, 2,854,494, and comprising an elongated confined concentration zone. The crystals are moved in a compact mass into a body of crystal melt which is formed by heating the crystals in a downstream portion of the concentration zone. A portion of the crystal melt is displaced back into the advancing crystal mass. The purification column includes an upstream liquid removal zone, a middle reflux zone and a downstream melting zone. Mother liquor is separated from the crystals in the liquid removal zone and the crystals are melted in the melting zone.

When operating a multi-stage crystallization process as described above, it has been observed that product concentrate is withdrawn from the final crystallization stage with the separated melted ice crystals, thereby substantially reducing the effectiveness of the crystallization to concentrate aqueous solutions.

I have discovered an improved multi-stage crystallization process wherein crystals separated from the mother liquor in the final crystallization stage are recycled to an upstream crystallization stage and the crystals in the final crystallization stage are refluxed with an upstream process stream.

Accordingly, an object of my invention is to provide an improved multi-stage crystallization process and apparatus therefor.

Another object of my invention is to provide an improved multi-stage crystallization process wherein the product yield withdrawn from the final crystallization stage is increased.

Other objects, advantages and features of my invention will be readily apparent to those skilled in the art from the following description, the drawing and the appended claims.

The invention is particularly applicable to the concentration by crystallization of aqueous solutions such as fruit juices, vegetable juices, wine, beer, milk and the like, but it is not intended that the invention should be limited thereto. The invention is applicable broadly to the concentration of liquid multi-component mixtures wherein at least one of the said components is capable of crystallization and separation from said mixture so as to form a product mixture wherein the remaining components have been concentrated.

The drawing is a schematic representation of one embodiment of the inventive process and apparatus therefor.

Referring to the drawing, the inventive process will be described as applied to the concentration of beer by crystallization. It is not intended, however, that the invention should be limited thereto. Beer comprising alcohol, sugars and water is passed via conduit means 10 to crystallization zone 11. Crystallization zone 11 comprises a conventional process and apparatus for chilling a liquid feed mixture to form crystals of at least a higher melting component and separating the crystals of the higher melting component from the mother liquor. Suitable crystallization processes which can be employed include processes wherein centrifuges are utilized to separate the mother liquor from the formed crystals; mother liquor is separated from the formed crystals by filtration; and wherein the total liquid feed mixture to the crystallization zone is frozen and the mother liquor is separated from the crystallized mass by distilling said crystallized mass under a high vacuum. As previously noted, in the patent to Schmidt, Re. 23,810, there is disclosed a process and apparatus for separating crystals from a slurry prepared by chilling a feed mixture which involves moving a mixture of crystals in mother liquor to a purification column in which the crystals are passed in a compact mass toward a body of crystal melt which is displaced back into the crystal mass.

Ice crystals are formed within crystallization zone 11 and are separated from the mother liquor and withdrawn from crystallization zone 11 via conduit means 12. The mother liquor comprising a recoverable product (alcohol and sugars) in concentrated form is withdrawn from crystallization zone 11 via conduit means 13.

The mother liquor withdrawn from crystallization zone 11 is passed via conduit means 13 to a final downstream crystallization zone comprising chiller 14 and purification column 16. Although only one upstream crystallization zone is herein illustrated, it is within the scope of this invention to employ additional crystallization zones between the initial and final crystallization zones wherein each of the said intermediate crystallization zones can be operated as described in connection with crystallization zone 11 and wherein the feed to each of the said intermediate crystallization zones comprises the mother liquor withdrawn from an upstream crystallization zone.

The final crystallization stage as herein illustrated comprises the process steps of chilling a liquid feed mixture to form crystals of at least a higher melting component, separating the crystals of the higher melting component from the mother liquor, and refluxing the crystals with a reflux liquid. As illustrated, mother liquor withdrawn from crystallization zone 11 is passed via conduit means 13 to a chiller 14. Chiller 14 can comprise any conventional apparatus wherein the temperature of the feed can be lowered so as to produce a slurry of crystals and a means for passing the said slurry of crystals therefrom. Conventional chilling apparatus comprises a jacketed vessel equipped with a surface scraper and with a cooling medium passed through the jacket in indirect heat exchange with the feed to the chiller. Within chiller 14, water is crystallized to form a crystal slurry which contains from about 10 to 55 and preferably about 15 to 45 weight percent solids. While it is desirable to concentrate to as high a degree as possible the formation of crystal solids, if the solids content is too high the slurry becomes quite stiff and becomes too difficult to pass from the chiller.

The slurry of ice crystals is passed from chiller 14 to purification column 16 via conduit means 17. Crystal purification column 16 can be a piston-type column substantially as described in the patent to Schmidt, Re. 23,810, or a pulse-type column as described in the patent to R. W. Thomas, 2,854,494, with the specific modifications as hereinafter described. In either type of column, a compacted mass of crystals is forced through the column; a filter section 18 is provided in an intermediate portion in purification column 16 so that mother liquor can be separated from the crystals and withdrawn from the column; and the compacted mass of crystals refluxed with a liquid passed countercurrently to the mass of crystals.

Whereas the purification column of Schmidt and the purification column of Thomas provide a means of heating the crystal mass in the downstream region of the column, thereby providing a reflux liquid and providing for withdrawal of the crystals from the purification column as a liquid melt, I have provided for the withdrawal of formed crystals from purification column 16 via conduit means 19 without transforming the solid crystals to liquid melt. A suitable method of separating the formed crystals from the crystal mass and withdrawing the crystals from the purification column is described in copending application Serial No. 280,952 by John E. Cottle, filed May 1, 1963, said application disclosing cutting the crystals from the crystal mass by means of a rotary cutter 20 and withdrawal of the separated crystals from the purification column.

The mass of crystals within purification column 16 is refluxed with a refluxing stream passed to purification column 16 via conduit means 21 from a source hereinafter described. Mother liquor containing alcohol and sugars in a highly concentrated state is withdrawn from filter section 18 via conduit means 22. Ice crystals containing occluded mother liquor is withdrawn from purification column 16 via conduit means 19 and recycled to an upstream crystallization zone. As illustrated, the ice crystals are recycled via conduit means 19 and conduit means 10 to an upstream crystallization zone 11. It is within the scope of this invention to recycle the ice crystals withdrawn from the final crystallization zone to other intermediate crystallization zones wherein the multi-stage crystallization process includes more than two crystallization stages.

By recycling the ice crystals in the defined manner, occluded mother liquor containing desirable recoverable products such as alcohol and sugar is subsequently recovered from the multi-stage crystallization process via conduit means 22. As the feed to crystallization zone 11 contains a substantially lower concentration of recoverable products (alcohol and sugars) than the concentration of the recoverable products in the feed to the final crystallization stage, it is possible to operate crystallization zone 11 so as to recover substantially pure water from crystallization zone 11 via conduit means 12. As the concentration of recoverable products in the feed material to the crystallization zone increases (conduit 13), the difficulty of effecting a separation of the water from the recoverable products without loss of recoverable products with the separated water is increased.

The crystal mass in purification column 16 can be refluxed by a portion of the feed to the multi-stage crystallization process passed to purification column 16 via conduit means 21. In addition thereto, the reflux liquid can comprise a portion of the melted ice crystals withdrawn from crystallization zone 11 and passed via conduit means 23, valve means 24, and conduit means 21 to purification column 16. The refluxing liquid can also, although not preferably, comprise a portion of the mother liquor withdrawn from crystallization zone 11 and passed via conduit means 13, conduit means 27, valve means 28 and conduit means 21 to purification column 16. Thus, the refluxing liquid employed in purification column 16 can advantageously comprise the feed to an upstream crystallization zone, the mother liquor withdrawn from an upstream crystallization zone, or the melted separated ice crystals withdrawn from an upstream crystallization zone or a combination thereof.

An advantage of recycling the crystals to an upstream crystallization zone is that process refrigeration requirements are reduced. If the recycle stream was liquid, additional refrigeration would be required to form crystals from the recycle stream. In addition thereto, process heat would be required to melt the crystals separated from the mother liquor in the final crystallization stage.

A further advantage of the invention is that by recycling the separated crystals, the normal high purity requirement of the crystals in the final crystallization stage is eliminated. Thus control of the final crystallization stage can be directed to and based solely upon the recovery of a mother liquor containing a desired product concentration.

The following example is illustrative of the inventive process, but it is not intended that the invention should be limited thereto.

EXAMPLE

Beer comprising 3.6 weight percent ethyl alcohol, 5.5 weight percent sugars and 90.9 weight percent water is passed via conduit means 10 to crystallization zone 11. Mother liquor comprising 12 weight percent ethyl alcohol, 18.3 weight percent sugars, and 69.3 weight percent water is withdrawn from crystallization zone 11 via conduit means 13 and passed to chiller 14. Melt comprising 0.1 weight percent ethyl alcohol, 0.2 weight percent sugars, and 99.7 weight percent water is withdrawn from crystallization zone 11 via conduit means 12.

Chiller 14 is operated so as to produce a slurry comprising 40 weight percent solids by maintaining a final chilling temperature of 0° F. The slurry comprising 40 weight percent solids is passed via conduit means 17 to purification column 16.

A mother liquor comprising 19 weight percent ethyl alcohol, 28.7 weight percent sugars, and 52.3 weight percent water is withdrawn from purification column 16 via conduit means 22. Ice crystals containing 1.5 weight percent ethyl alcohol and 2.3 weight percent sugars is withdrawn from purification column 16 and recycled via conduit means 19 and conduit means 10 to crystallization zone 11.

Various modifications of this invention can be made, or followed, in view of the foregoing disclosure, without departing from the spirit or scope thereof.

I claim:

1. In a multi-stage crystallization process which comprises passing a liquid multi-component mixture to a first crystallization zone, forming a slurry comprising mother liquor and crystals within said first crystallization zone and following crystallization zones, the final crystallization zone comprising a chilling zone and a purification zone, and separating said mother liquor from said crystals in said first and following crystallization zones, the liquid feed to each of said following crystallization zones comprising the mother liquor withdrawn from the adjacent upstream crystallization zone; the improvement which comprises refluxing the crystals by flowing a liquid counter-current to said crystals in said purification zone of said final crystallization zone, the liquid comprising at least one of said liquid multi-component mixture, a liquid melt product obtained from an upstream crystallization zone, and said mother liquor from an upstream crystallization zone, and recycling the refluxed crystals, separated from the mother liquor in the purification zone of the final downstream crystallization zone, to a crystallization zone upstream of said final crystallization zone.

2. The process of claim 1 wherein said process liquid comprises the liquid feed to an upstream crystallization zone.

3. The process of claim 1 wherein said process liquid comprises at least a portion of the melted crystals formed in an upstream crystallization zone.

4. The process of claim 1 wherein said liquid multi-component mixture is an aqueous solution.

5. A process which comprises passing a liquid multi-component mixture to a first crystallization zone, forming a slurry comprising mother liquor and crystals within said first crystallization zone, separating said mother liquor from said crystals, passing said separated mother liquor to a second crystallization zone, said second crystallization zone comprising a chilling zone and a purification zone, forming a slurry comprising mother liquor and crystals within said chilling zone of said second crystallization zone withdrawing a mother liquor from said purification zone of said second crystallization zone, recycling refluxed crystals from said purification zone of said second crystallization zone to said first crystallization zone, and refluxing the crystals in said purification zone of said second crystallization zone by flowing a liquid countercurrently through said crystals, said liquid comprising at least one of said liquid multicomponent mixture, a liquid melt product obtained from said first crystallization zone, and said separated mother liquor from said first crystallization zone.

6. The process of claim 5 wherein said first crystallization zone liquid comprises a portion of said liquid multicomponent mixture.

7. The process of claim 5 wherein said liquid multicomponent mixture is an aqueous solution.

8. The process of claim 5 wherein said liquid multicomponent mixture is beer.

References Cited by the Examiner

UNITED STATES PATENTS

| | | | |
|---|---|---|---|
| 2,815,364 | 12/1957 | Greene. | |
| 3,050,952 | 10/1962 | Marwil | 62—58 |
| 3,069,864 | 12/1962 | Crosby | 62—58 |

FOREIGN PATENTS 841,374   7/1960   Great Britain.

NORMAN YUDKOFF, *Primary Examiner.*